March 22, 1932.  E. A. SPERRY ET AL  1,850,640
SELF SYNCHRONOUS TRANSMISSION SYSTEM
Filed April 10, 1920  4 Sheets-Sheet 1

INVENTORS
ELMER A. SPERRY &
ELMER A. SPERRY JR.
BY
Herbert H. Thompson
THEIR ATTORNEY

INVENTORS
ELMER A. SPERRY &
ELMER A. SPERRY. JR.
BY Herbert H. Thompson
THEIR ATTORNEY

March 22, 1932.      E. A. SPERRY ET AL      1,850,640
SELF SYNCHRONOUS TRANSMISSION SYSTEM
Filed April 10, 1920      4 Sheets-Sheet 3

Turret Sending

INVETORS
ELMER A. SPERRY &
ELMER A. SPERRY JR.
BY
Herbert H. Thompson
THEIR ATTORNEY March 22, 1932.  E. A. SPERRY ET AL  1,850,640
SELF SYNCHRONOUS TRANSMISSION SYSTEM
Filed April 10, 1920   4 Sheets-Sheet 4

INVENTORS
ELMER A. SPERRY &
ELMER A. SPERRY, JR
By their Attorney
Herbert H. Thompson Patented Mar. 22, 1932

1,850,640

UNITED STATES PATENT OFFICE

ELMER A. SPERRY AND ELMER A. SPERRY, JR., OF BROOKLYN, NEW YORK, ASSIGNORS, BY MESNE ASSIGNMENTS, TO SPERRY GYROSCOPE COMPANY, INC., OF BROOKLYN, NEW YORK, A CORPORATION OF NEW YORK

SELF SYNCHRONOUS TRANSMISSION SYSTEM

Application filed April 10, 1920. Serial No. 372,809.

This invention relates to transmission systems adapted to position an indicator or other object in accordance with the position of a remotely located element. One of the objects of our invention is to improve the general type of transmission systems employing alternating current whereby greater sensitiveness as well as directive power may be obtained.

Another object is to provide in a self synchronizing transmission system, an indicating instrument from which the position of a remotely located element may be easily determined with a high degree of accuracy and in which the directive power of the repeaters is conserved.

A further object of our invention is the provision of an improved type of indicator especially useful in fire control operations and in which the relative positions of a target and a turret may be readily and accurately indicated with a minimum load on the repeater system.

Still another object is to provide a transmission system in which the receiving instrument may be automatically and accurately restored to synchronism with the sending instrument in case synchronism has been lost.

Referring to the drawings wherein we have illustrated what we now consider the preferred forms of our invention.

Figure 1:
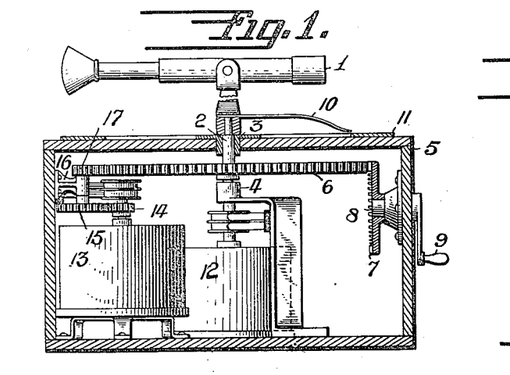
Fig. 1 is a side elevation of a transmitting instrument, the casing therefor being shown in section.

While our transmission system may be used to indicate the angular position of any remotely located object, such for example as a compass card or other indicator, we have shown it in connection with a sighting instrument, for indicating the bearing of a target. In Fig. 1 the sighting instrument 1 is shown carried by a shaft 2, the latter being journaled in bearings 3, 4, in a casing 5. Shaft 2 may be rotated in any suitable way, as by means of a gear wheel 6 fixed on said shaft and meshing with a crown gear 7 on a shaft 8 mounted in casing 5. Shaft 8 may be actuated by means of a crank handle 9 or in any other suitable manner. If desired, an indicator 10 may be mounted to turn with shaft 2 and may cooperate with a scale 11 carried by casing 5 as shown.

For transmitting the angular positions of instrument 1 and pointer 10, we have shown a transmitter 12 connected directly with shaft 2 and a second transmitter 13 connected with said shaft through gearing. Thus, the shaft of transmitter 13 is shown carrying a gear 14 which meshes with a gear 15 carried by a shaft rotatable in bracket 16 in casing 5, which shaft also carries a gear 17 meshing with the gear wheel 6 on shaft 2. Obviously various types of connections may be made between shaft 2 and transmitter 13, and the connection shown is merely illustrative. The connection aforesaid may, of course, be designed to give any suitable number of revolutions of the shaft of transmitter 13 to one revolution of shaft 2. For purposes of illustration we have assumed that gearing suitable for obtaining 72 revolutions of the shaft of transmitter 13 to one of shaft 2, or, in other words, one revolution of said transmitter shaft to rotation of shaft 2 through five degrees, has been provided.

Figure 7:
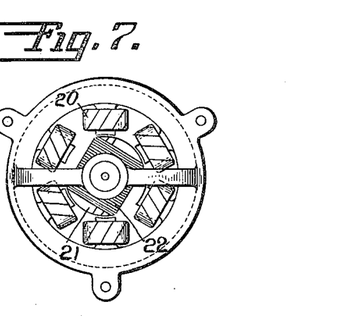
Fig. 7 is a plan view of an improved form of alternating current repeater motor.

At the receiving station we have shown two repeater motors 18 and 19, the former being connected with transmitter 12, and the latter with transmitter 13. The transmitters and repeaters which we have shown are of a general type known in the art wherein each comprises a single phase rotor and a three phase stator. We have, however, improved the construction of these devices in order to secure greater torque or directive power as well as indications of greater accuracy. As shown in Fig. 7, each transmitter and repeater motor may have a plurality of field poles 20, about which the stator winding is wound. Cooperating with the said poles is an armature 21 of special construction, shown in detail in Figs. 8 and 9, and having a suitable winding 22 which is connected to a single phase alternating current source.

Figure 8:
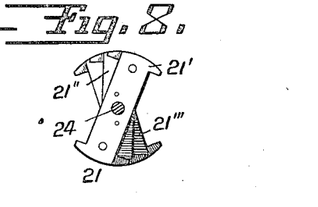
Fig. 8 is a plan view of an improved form of armature for use with said repeater motor.
Figure 9:
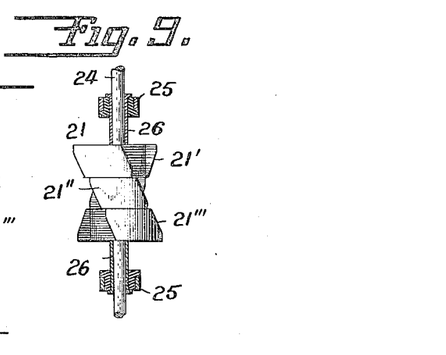
Fig. 9 is a side elevation, partly in section, of the armature shown in Fig. 8.

In Figs. 8 and 9, armature 21 is shown as comprising a plurality of sections of iron or other material, 21', 21'', and 21'''. While we have shown three of such sections for purposes of illustration it will be evident that the number thereof may be varied as desired. Each section is preferably laminated and the sections are given a slight angular displacement with relation to each other before being secured together. Said sections may be secured together and to armature shaft 24 in any suitable manner. Slip rings 25 are shown mounted on and insulated from spacing sleeves 26 carried by shaft 24, which rings serve to conduct current to the armature coil. The end portions of the armature sections are shown curved and of greater width than the intermediate parts of the sections. In the form shown in Figs. 8 and 9, the edges of each end portion are shown beveled or inclined, the edges of one end portion of each section being inclined oppositely from the edges of the opposite end of said section, and the edges of all end portions at the same end of the armature sections being inclined in the same direction. It is found that, with the armature constructed as above described, greater sensitiveness as well as greater torque are secured as will be pointed out later.

Figure 10:
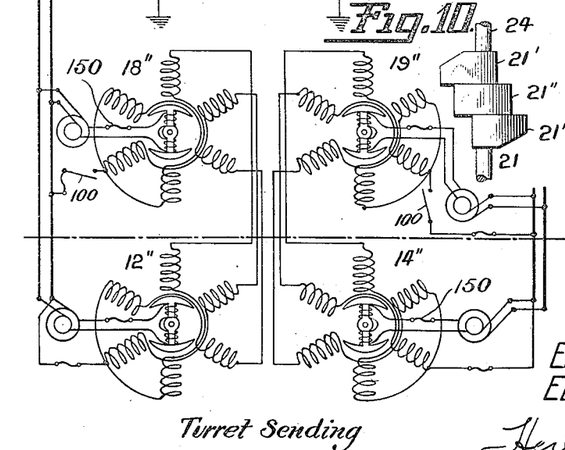
Fig. 10 is a side elevation of another form of repeater armature.
Figure 11:
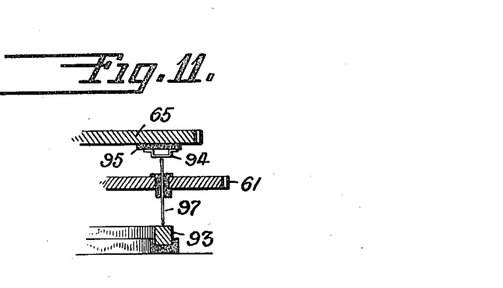
Fig. 11 is a detail view of a spark gap.
Figure 12:
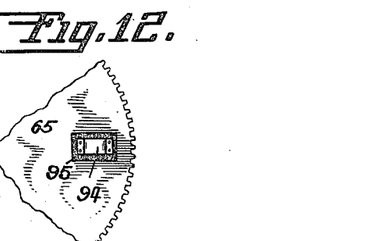
Fig. 12 is a view of a detail.

In Fig. 10 another form of transmitter or repeater motor armature which may be used is shown, wherein the end of the bottom and top armature sections are shown provided with inclined portions.

Figure 6:
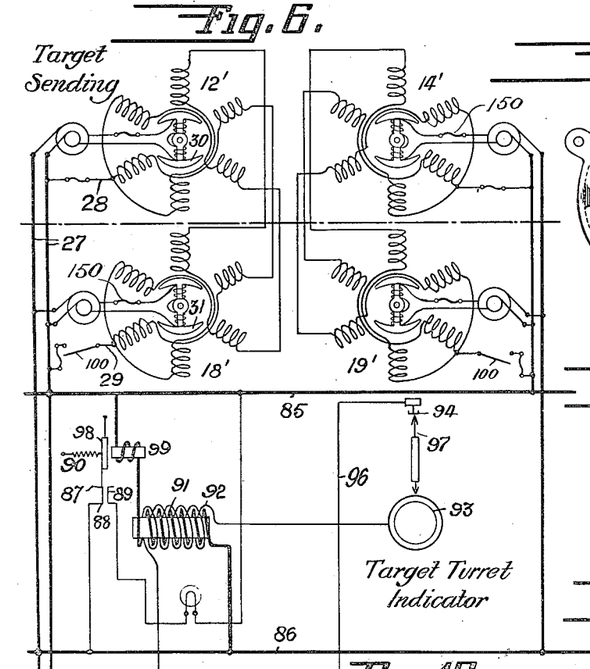
Fig. 6 is a wiring diagram showing one form of connections for actuating the indicating instrument of Figs. 4 and 5.

In the wiring diagram of Fig. 6 we have shown one method by which the repeaters may be connected with their respective transmitters. Thus, the armature windings of transmitter 12' and repeater 18' are shown connected with single phase alternating current mains 27. The three pairs of field coils of the transmitter 12' are connected at one end with corresponding field coils of the repeater 18' and at their other end are connected together. Likewise, the three pairs of repeater coils are connected together at one end. Conductors 28 and 29 may connect the interconnected field coils of the transmitter 12' and repeater 18' respectively with one of the A. C. mains, thereby providing a common return for the current in the stator field coil system.

The operation of the above described transmitter repeater system will be readily understood by those skilled in the art. When the transmitter armature 30 moves with relation to the repeater armature 31, currents are induced in the repeater field windings, and the armature 31 will take up a position corresponding to the armature 30 wherein the armatures of the transmitter and repeater occupy the same positions relatively to the interconnected points of their stator windings, and in which equal but opposing E. M. F.'s are induced in said windings. The repeater armature thus follows or reproduces the movement of the transmitter armature. It should furthermore be noted that this type of transmission system is self synchronous. If the transmitter be moved when the current is off, the corresponding repeater will automatically take up a position corresponding with the transmitter when the current comes on. The effect of stepping the armature sections will now readily be seen when the action of a transmitter armature having a single section and in a position squarely in front of a field pole is considered. If, now, the said transmitter armature be moved slightly there will be no change in the number of magnetic lines of force through the field coil winding. In order to induce sufficient current in the stator field coil system to cause motion of the repeater armature, considerable angular motion of the transmitter armature would be necessary. By suitably stepping the armature sections, however, it will be seen that the sections may be so arranged that, although a slight motion of one section by itself would not induce sufficient current in the field system, another section will by such movement be brought under or moved out from beneath the field pole, depending on the direction of turning of the armature, to cause a considerable change in the number of lines of force therethrough so that sufficient current will be induced to move the repeater armature in the corresponding direction. In considering the effect of the stepped sections of the repeater armature it should be noted that the latter assumes a position of equilibrium when the E. M. F. induced thereby in the stator field coil system balances the E. M. F. induced by the transmitter armature. If the repeater armature had but one section, this position would correspond only somewhat roughly with that of the transmitter armature since, in any of several positions of the repeater armature opposite a given field pole there would be no change of lines of force and the same E. M. F. would be induced. By providing stepped armature sections, however, similar to those of the transmitter the region in which no change of the number of lines of force occurs is cut down considerably. Consequently the angular distance through which the repeater and transmitter armatures turn without varying the E. M. F. of the stator field coil system is lessened and the sensitiveness and torque of the transmission system increased.

Figure 2:
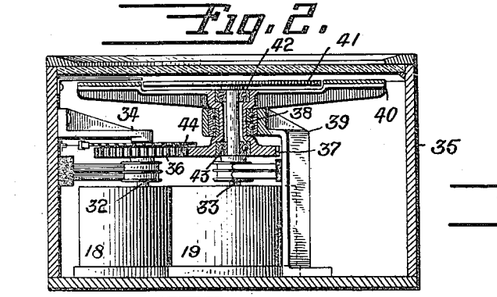
Fig. 2 is a side elevation of a receiving or repeating instrument with the casing therefor in section.
Figure 3:
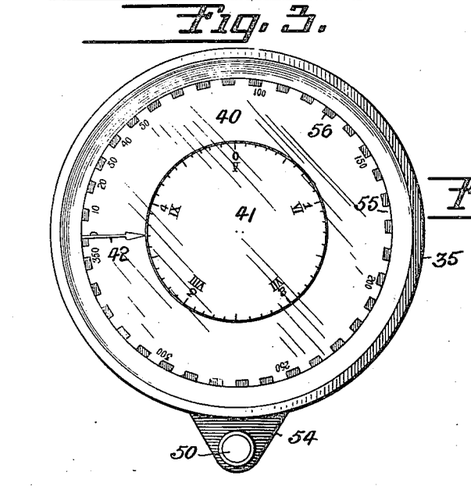
Fig. 3 is a plan view of the receiving instrument of Fig. 2.

Referring now to Figs. 1, 2, and 3, it will be seen that, when repeaters 18 and 19 are connected in the manner above described with transmitters 12 and 13, respectively, the armature shaft 32 of repeater 18 will follow the movements of the shaft of transmitter 12. Shaft 32 is shown mounted at one end in a bearing 34 in the casing 35 of the receiving instrument, and may be provided with a gear wheel 36 meshing with a similar gear wheel 37 mounted on or formed integral with a sleeve 38 mounted in a suitable bearing 39 and carrying a suitable reference member, such as a circular scale 40. The ratio between gears 36 and 37 is preferably one-to-one, so that reference member 40 may be driven at the same rate as sighting instrument 1. For enabling the position of said instrument to be indicated with a high degree of accuracy, we have provided another reference member, such as scale 41, concentric with scale 40 and driven by shaft 33 of repeater 19. Said scale is shown mounted upon said shaft, and the latter may be journaled in suitable anti-friction bearings 42, 43 provided within sleeve 38 and gear 37, as shown.

Figure 13:
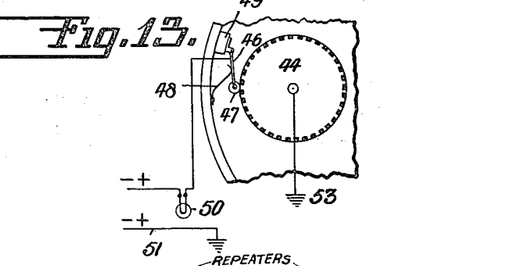
Fig. 13 is a detail diagrammatic view of certain circuit closing means.

It will now be seen that, with a gear ratio between shaft 2 and transmitter 13 such that said transmitter makes one revolution whenever said shaft turns through five degrees, scale 41 will make one revolution when scale 40 turns through five degrees. Consequently the position of the instrument 1 can be determined roughly from scale 40 while the finer readings, in units of degrees and fractions thereof, can be easily made from scale 41. The scales 40 and 41 are accordingly provided with properly coordinated graduations. A cooperating reference member, such as a pointer 42 may be provided in connection with the aforementioned scales. The pointer may, as shown, be arranged so that its tip cooperates with scale 41 and the side of the pointer with scale 40. In order to enable scale 40 to be graduated in tens of degrees, whereby said scale may be of comparatively small size and a multiplicity of graduations avoided, and at the same time read units and fractions of degrees from scale 41 between the ten degree graduations of scale 40, the graduations on the scales may be arranged substantially as follows:

Scale 41, as shown, is divided into five equal parts which may be suitably subdivided, each part corresponding with one degree of turning of instrument 1. Scale 41 is further provided with two concentric sets of indications. One set of indications supplements the other so that readings from zero to five degrees may be made from one set and from five to ten degrees from the other. To aid in readily distinguishing one set of indications from the other, one set may consist of Arabic numerals and the other of Roman numerals, as shown. To assist in determining which set of the indications of scale 41 should be read in conjunction with scale 40, various means may be provided. One form which said means may assume is shown in Figs. 2, 3, and 13 and may be constructed substantially as follows:

Driven by shaft 32 is a disc 44 which may be provided with contact portions alternating with portions of insulation. Said contact and insulation portions are of equal extent and are so arranged with relation to the graduations of scale 40 that during the passage under pointer 42 of one ten degree subdivision of scale 40, an insulation portion and a contact portion of disc 44 will pass through engagement with a cooperating contact arm 46. The latter may be provided with a trolley 47, so that the torque or directive force of the transmission system may be conserved. The trolley may be biased into engagement with disc 44 by means of a spring 48, the contact arm being shown pivoted to a suitable bracket 49 at its end opposite trolley 47. In series with contact arm 46 is a lamp 50, which may be connected with alternating current mains 51. One of the mains is shown grounded at 52, and disc 44 is likewise shown grounded at 53. In this manner it will be seen that, when trolley 47 is in engagement with one of the contact portions of disc 44, lamp 50 will be lighted. Now, with the contact and insulation portions of disc 44 arranged as described it will be evident that lamp 50 will be lighted during one-half of the travel under pointer 42 of each ten degree subdivision of scale 40. In other words, lamp 50 will be energized during alternate five degree portions of the travel of scale 40. Consequently, when lamp 50 is energized, the readings of scale 41 should be taken with reference to one set of indications, while, when said lamp is deenergized, said readings should be taken from the other set of indications. Lamp 50 should preferably be placed in proximity to scales 40 and 41. In Fig. 3 we have shown the lamp mounted in a bracket 54 attached to casing 35.

Another convenient arrangement for indicating which set of indications of scale 41 should be utilized is shown in Fig. 3, wherein each ten degree subdivision is shown divided into equal portions, one of which is colored differently from the other. For example, the first half of each subdivision may be colored white, as at 55, and the other half red, as at 56. With this arrangement, when a white portion of scale 40 is under pointer 42, readings of scale 41 should be taken from the Arabic set of indications, while, when a red portion is under said pointer, the readings of scale 41 should be taken with reference to the Roman numerals thereon. The receiving instrument may be provided with both of the means above described for determining what set of indications on scale 41 should be read although one of said means may obviously be omitted if desired. It will be seen that by providing five main divisions on scale 41 and suitably subdividing said divisions, degrees and fractions thereof may be read from said scale more easily and accurately than if a larger number of main divisions were provided.

Figure 4:
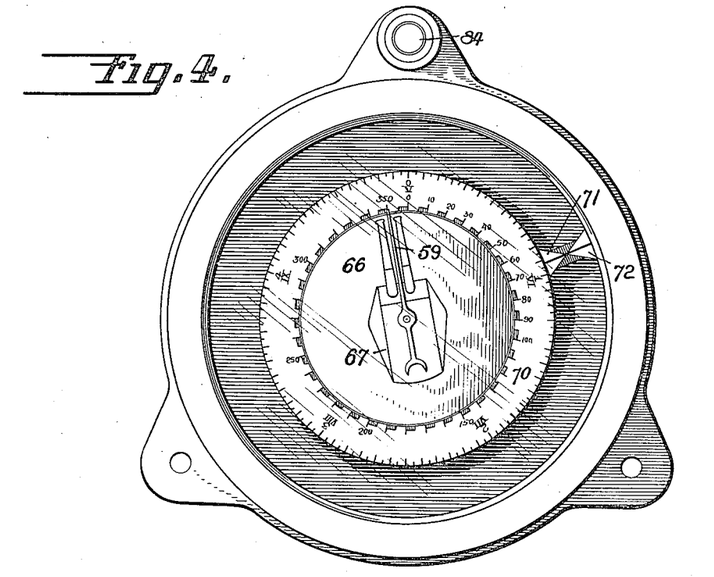
Fig. 4 is a plan view of an improved type of indicator embodying certain features of our invention.
Figure 5:
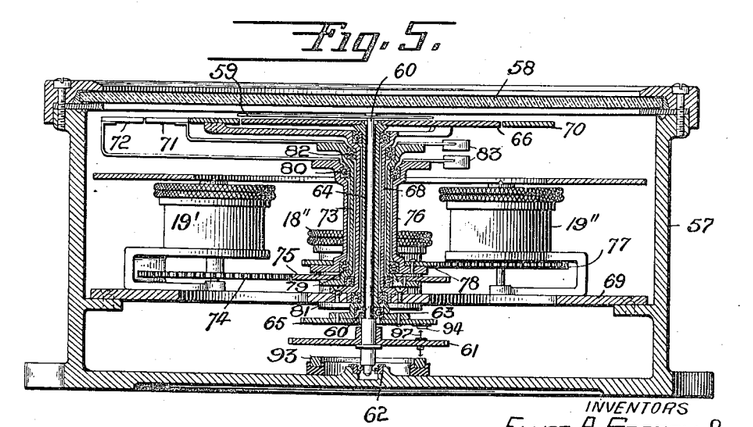
Fig. 5 is a vertical sectional view of the indicating instrument of Fig. 4.
Figure 17:
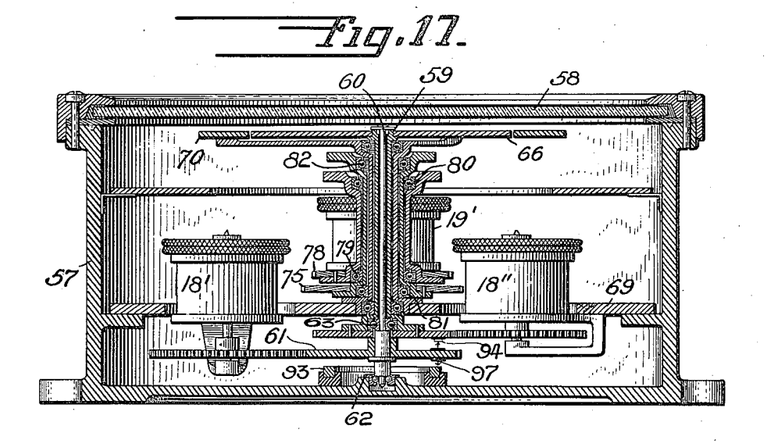
Fig. 17 is a sectional view taken in a plane at right angles to the plane of Fig. 5.

In Figs. 4, 5 and 17 is shown an improved form of "target turret indicator" or, in other words, an instrument which indicates the position of a turret as well as the bearing of the target. The wiring in connection with this instrument is shown in Fig. 6 wherein two transmitters 12′ and 14′, which may correspond with transmitters 12 and 13, respectively, of Fig. 1, serve to transmit rough and accurate indications, respectively, of the bearing of the target. Repeaters 18′ and 19′ at the target turret indicator are connected with said transmitters, respectively, as shown. Transmitters 12″ and 14″ serve likewise to transmit rough and fine indications of the position of the turret to repeaters 18″ and 19″ respectively, at the target turret indicator. The means for operating the transmitters 12″ and 14″ from the turret forms no part of our invention and is well understood in the art. For example, said transmitters may be driven from the turret in the manner shown in the patent to E. A. Sperry, No. 1,296,439, March 4, 1919.

The target turret indicator may, as shown, consist of a casing 57 provided with a suitable glass cover 58. Within the casing we have shown a reference member, such as a pointer 59 mounted on a shaft 60, which shaft is adapted to be driven by repeater 18′ through the medium of a gear wheel 61. Shaft 60 may be mounted within an anti-friction bearing 62 in the base of casing 57 and a similar bearing 63 within a tubular shaft 64. The latter shaft may be driven, through the medium of a gear wheel 65, by repeater 18″ and carries at its upper end a suitable turret position indicator. As shown this latter indicator comprises a card 66 having thereon a representation 67 of the turret and guns. Shaft 64 in turn is shown mounted in suitable anti-friction bearings within a stationary tubular member 68, the latter being secured to a partition 69 within casing 57. Member 68 may carry at its upper end annular reference member 70 having an inner set of graduations for cooperation with pointer 59 and turret indicator 67, said member 70 also being provided with an outer set of graduations for cooperation with auxiliary reference members or indicators 71 and 72. Member 71 may be mounted on a rotatable tubular shaft 73 which shaft is shown driven by repeater motor 19′ through the medium of gears 74 and 75. Repeater 19″ is shown as driving a tubular shaft 76 through gears 77 and 78, said shaft carrying at its upper end the reference member 72. Shaft 76 is shown surrounding shaft 73 and supported on an anti-friction bearing 79 at the base of said latter shaft, a second anti-friction bearing 80 being interposed between said shafts adjacent the upper portions thereof. Shaft 73 may, in turn, be supported on an anti-friction bearing 81 at the base of stationary tubular member 68, an anti-friction bearing 82 being inserted between the upper portion of said shaft and member. Counterbalancing members 83 may be mounted on shafts 73 and 76 at points opposite from indicators 71 and 72, respectively. Repeaters 19′ and 19″ may be mounted in any suitable manner within casing 57, as, for instance, on partition 69 as shown.

Assuming that repeaters 19′ and 19″ make one complete revolution for each five degree rotation of repeaters 18′ and 18″, respectively, it will be seen that, with the proper gearing between said repeaters and the respective indicators which they drive, reference member 71 will make a complete revolution whenever pointer 59 turns through five degrees and likewise member 72 will make a complete revolution for each 5° turn of turret indicator 67. For readily enabling degrees and fractions thereof to be read from member 70, we have shown the outer circumference thereof divided into units of degrees and fractions thereof. The inner circumference of member 70 may be graduated to read tens of degrees as shown. We have shown the outer circumference divided into five main divisions having two sets of graduations, one from zero to five, and the other from five to ten, in a manner similar to the indicator of Fig. 3. The main divisions are, of course, further subdivided to indicate fractions of degrees. Of course, the relative rates of motion of indicator 71 and pointer 59 and of indicator 72 and indicator 67 may be varied as desired, in which case the outer circumferential portion of reference member 70 will be subdivided correspondingly. To enable the user of the instrument to determine which set of indications on the outer part of indicator 70 should be read, we have shown the ten degree subdivisions of said member divided into differently colored portions as in Fig. 3.

In the use of the target turret indicator above described, it will be evident that the bearing of the target may be determined accurately from pointer 59 and indicator 71 in conjunction with member 70. At the same time, the position of the turret will be indicated by indicators 67 and 72. The instant that the turret is in the correct position, indicators 59 and 71 will coincide with indicators 67 and 72, respectively, auxiliary indicators 71 and 72 serving to indicate accurately when the turret is pointing in the correct direction. It is highly desirable that a signal be given when indicating members 71 and 72 approach coincidence. In order to conserve to as great a degree as possible the torque or directive power of the repeaters, we have devised a circuit closing means operated on approach of the indicators 71 and 72 and which causes no load, either frictional or otherwise, on the repeaters. Such circuit closing means may be constructed substantially as follows:

Located adjacent the target turret indicator, and preferably carried by casing 57, as shown, is a lamp 84, which lamp may be connected across suitable A. C. mains. In Fig. 6 the lamp is shown connected across wires 85, 86, which latter wires are in turn shown connected across mains 27. The circuit through said lamp is normally broken, as shown, but is adapted to be closed when contact piece 87 bridges contacts 88, 89. Bridging piece 87 is shown connected to a pivoted armature 98 of an electromagnet 99, said armature being normally held by a spring 90 out of engagement with magnet 99. The latter is connected with the primary winding 91 of an induction coil, which winding is shown connected across wires 85, 86. The secondary winding 92 of said induction coil may be grounded at one end and connected at its other with an annular member 93 of conducting material carried by and insulated from casing 57. Carried by gear wheel 65 is a contact piece 94, insulated from said gear wheel at 95 and connected with a suitably grounded conductor 96. Gear wheel 61, which is shown interposed between gear wheel 65 and annular member 93 is provided with a conductor 97 suitable for forming a spark gap and insulated from said gear wheel 61. Said conductor 97 is positioned directly above ring 93, and the arrangement of said conductor and ring with relation to contact 94 is such that, when indicators 71 and 72 approach coincidence, contact 94 lies directly above conductor 97 and spark gaps are created between conductor 97 and conductors 93 and 94. Under these conditions the current induced in the secondary coil 92 will discharge across the aforesaid spark gaps, and when such discharge takes place the current through primary coil 91 increases, as is well known in the art. The tension of spring 90 is so adjusted that, for normal current flow through coil 91, armature 98 will not be attracted by magnet 99, but, when the current in coil 91 increases due to discharge of current in the secondary across the spark gap, the tension of spring 90 will overcome the armature 98 attracted to bridge contacts 88 and 89. Thereupon, lamp 84 will be energized and will remain so as long as contact 94 lies above contact 97. A signal is thereby given that auxiliary indicators 71 and 72 are approaching coincidence. Said indicators may then be observed to determine when the turret is exactly in the correct position.

Figure 15:
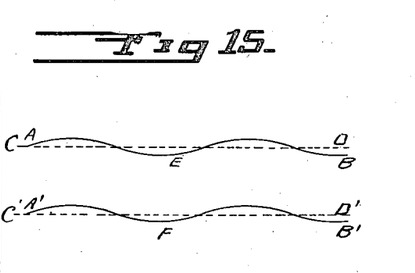
Fig. 15 is a diagrammatic view showing how the effect of fluctuations in the indications of the repeaters is nullified in connection with the instrument of Figs. 4 and 5.

In alternating current transmission systems of the types described the repeater indicator often tends to vary or fluctuate with respect to the correct indications; that is, the repeater readings differ from the correct or transmitted readings by amounts which vary as the transmitter is rotated. Frequently the indicated readings alternately lead and lag behind the correct readings. For example, at 0° both transmitted and indicated readings may be equal; then as the transmitter is rotated the indicated readings may exceed the transmitted readings by amounts which increase steadily during rotation of the transmitter until, when the transmitted reading is 90°, the indicated reading is 90° 30'. Upon further rotation of the transmitter the amounts by which the indicated readings exceed the transmitted readings may decrease steadily until the transmitted reading is 180°, at which time the indicated or repeater reading is also 180°. As the transmitter is rotated further the indicated readings may be less than the transmitted readings by amounts which increase until the transmitted reading is 270°, at which time the indicated reading is 269° 30'. Then upon further rotation of the transmitter the differences by which the transmitted readings exceed the repeater readings steadily decrease until at 360° the transmitted and repeater readings are again the same. This is illustrated in Fig. 15 wherein the sinuous line A B represents the fluctuations of the readings indicated by repeater 19' with respect to the correct target bearing readings, the latter being indicated by dotted line C D. The correct turret position readings are indicated in said figure by line C' D' and the fluctuations of repeater 19'' by line A' B'.

Now since the target bearing and turret position repeaters are connected with the same source of alternating current and are similarly constructed their variations or fluctuations will be the same. It will now readily be seen from the arrangement disclosed that such fluctuations will not interfere with the coincidence of the target bearing and turret position indicators at the exact time when the turret guns are pointed accurately at the target, since the fluctuations will merely result in the same error in the individual indicators but will not cause them to coincide at the wrong time. For example, assume that the target is at an angle of 75° with respect to the ship and that the target bearing indicated at 74° 59′. Now if, when the turret reaches a position of 75°, the turret indicator were, for example, 75°, it is evident that the indicators 71 and 72 would not coincide at the correct time. If, however, the turret and target indicators both indicate a position of 74° 59′ when the turret position and target bearing are 75°, the said indicators will coincide exactly at the correct time and the error due to fluctuations in the indications will be eliminated. Since in the construction disclosed the fluctuations of the repeaters are identical the readings of the indicators will be the same for any given angle. In Fig. 15, line E F represents coincidence of the indicators, and the elimination of the effect of errors or fluctuations of the repeaters on such coincidence is graphically illustrated. It will thus be seen that, though the errors in the individual readings are not eliminated their joint effect is nullified and they are combined so as not to cause coincidence of the indicators at the incorrect time.

Figure 14:
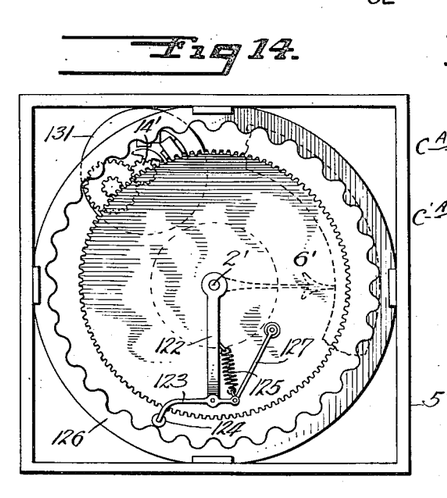
Fig. 14 is a plan view of a modified form of transmitter, the top of the casing thereof being removed.

In Fig. 14 is shown one form of means for completely eliminating the fluctuations or variations of the transmission system so that the repeater will cause the transmitted positions to be indicated with precision and without any error due to fluctuations. While this means may be applied at the repeating instrument we have shown it in connection with a transmitting instrument similar to that of Fig. 1. Gear 6′, which serves to drive transmitter 131 through multiplying gearing 17′, 15′, 14′, is loosely mounted with respect to shaft 2′. Attached to said shaft and movable therewith is a crank arm 122 carrying at one end a lever 123 provided with a roller 124. A spring 125 connected at one end to arm 122 and at its other to lever 123 serves to maintain roller 124 in engagement with the internal periphery of a stationary cam member 126 suitably secured to casing 5′. A link 127 serves to connect lever 123 with gear 6′ as shown. From the construction above described it will now be seen that, if the internal periphery of cam 126 be provided with suitable fluctuations and the connections between gear 6′ and arm 122 suitably proportioned, fluctuations equal and opposite to the fluctuations of the transmitting system will be imparted to the rotor of transmitter 131, with the result that the fluctuations inherent in the transmission system will be completely wiped out.

In case one or more of the repeaters should for any reason become stuck while the current is still on and the transmitter is in motion it will be evident that a reaction will be exerted on the other repeaters tending to throw them out of synchronism with their transmitters. To prevent this we have shown switches 100 interposed in the connections between each repeater and its corresponding transmitter. Consequently, when it is observed that a repeater is not operating while the others are in operation, the corresponding switch 100 may be operated to break the circuit between that repeater and its transmitter.

Figure 16:
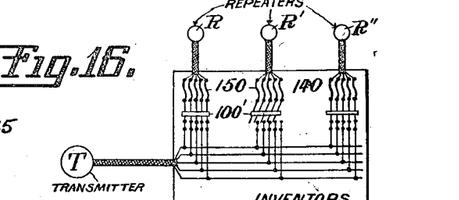
Fig. 16 is a diagrammatic view showing certain switchboard connections between a transmitter and a plurality of repeaters.

In Fig. 16 we have shown diagrammatically a plurality of repeaters R, R′, and R″ connected with a transmitter T. In this manner readings may be sent by said transmitter to different points. Switches 100′ are shown at switchboard 140 for the purpose of disconnecting any of the repeaters from said transmitter. It is furthermore desirable to interpose fuses 150 in the repeater connections, as shown in Figs. 6 and 16, so that the short circuiting of any repeater will not interfere with the operation of the other repeaters. The fuses are also useful in automatically disconnecting from the transmission system any repeater which has become stuck for a certain length of time with resulting excessive current therethrough.

While we have shown the repeaters connected directly with the indicators, it will be obvious that said repeaters may operate the indicators through suitable relays. Various other modifications will readily occur to those skilled in the art.

In accordance with the provisions of the patent statutes, we have herein described the principle of operation of our invention, together with the apparatus, which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a synchronous transmission system, a transmitting indicator, a repeater indicator, a transmission system for transmitting force between said indicators, there being variations inherent in the transmission system between the indicators to produce variations in the indications of said indicators, and means for increasing and decreasing the transmitted forces to oppose said variations automatically.

2. In combination, a transmitting indicator, a repeater indicator, a transmission system between said indicators having variations inherent therein that oscillate in value throughout the range of operation thereof, and means for counteracting said variations.

3. In a synchronous transmission system, a transmitting instrument, a repeating instrument, an alternating current transmission system connecting said instruments and subject to errors inherent therein whereby the indications of said repeating instrument vary with respect to those of said transmitting instrument, and means for varying the impulses transmitted to said repeating instrument by said system to produce variations opposing said errors.

4. In a transmission system employing alternating current, a pair of indicators, an A. C. transmitter connected to one indicator, an A. C. repeater motor connected to the other indicator, electrical connections between said transmitter and motor whereby said indicators operate in synchronism and are subject to variations inherent in the system that oscillate in value throughout the range of operation thereof, and means for counteracting said variations.

5. In a transmission system, a pair of indicators, an A. C. transmitter actuated by one indicator, an A. C. repeater motor connected to the other indicator, electrical connections between said transmitter and motor whereby said indicators operate in synchronism, said repeater indicator being subject to variations that fluctuate in value with respect to the other indicator throughout the range of operation thereof, and means for interposing a force causing variations equal and opposite to said first variations.

6. In a transmission system, a transmitting indicator, a repeating indicator, electrical interconnections between said indicators whereby they operate in synchronism, said repeating indicator being subject to variations that fluctuate in value with respect to the transmitting indicator throughout the range of operation of said transmitting indicator, and means for varying the transmitted forces to oppose said variations.

7. In a transmission system, a transmitting indicator, a repeating indicator, electrical interconnections between said indicators whereby they operate in synchronism, said repeating indicator being subject to variations that fluctuate in value with respect to the transmitting indicator throughout the range of operation of said transmitting indicator, and means connected to said transmitting indicator for varying the transmitted forces to oppose said variations.

8. In a self-synchronizing transmission system, a plurality of sending devices, a receiving instrument having a scale provided with coarse and fine indications, a coarse indicator and a fine indicator controlled by each of said sending devices and cooperating with the respective coarse and fine indications whereby said coarse indicators and said fine indicators will coincide when said sending devices transmit the same indication.

9. In a self-synchronizing angular transmission system, a plurality of sending devices, a receiving instrument having a circular scale provided with concentric coarse and fine indications, a coarse indicator and a fine indicator controlled by each of said sending devices and cooperating with the respective coarse and fine indications whereby said coarse indicators and said fine indicators will coincide when said sending devices transmit the same angle.

10. In a self-synchronizing angular transmission system, a plurality of sending devices, a receiving instrument having a circular scale provided with an inner and outer set of indications, one coarse and the other fine, a coarse indicator and a fine indicator controlled by each of said sending devices and cooperating with the respective coarse and fine indications whereby said coarse indicators and fine indicators will coincide when said sending devices transmit the same angle.

11. In an angular position indicator, a graduated major indicator, a secondary indicator adapted to make a plurality of revolutions for each major graduation on the major indicator, a plurality of scales associated with said secondary indicator, and means associated with the major indicator for showing which scale to read.

12. In an angular position indicator, a graduated major indicator, a secondary indicator adapted to make a plurality of revolutions for each major graduation on the major indicator, a plurality of scales associated with said secondary indicator, and a plurality of characteristic markings on said major indicator between each major graduation for showing which scale to read.

13. In combination, a transmitter, a receiver responsive to the transmitter and subject to error-producing influences, and means operable substantially according to predetermined law to effect said transmitter to compensate for the effect on the receiver of said influences.

14. In combination, a transmitter, a receiver having a movable part, circuit connections between said transmitter and receiver whereby the movable part of the latter is displaced by operation of said transmitter, means for predeterminedly setting said transmitter, and means controlled to act proportionately to predetermined variations for automatically modifying the resultant displacement of the movable part of the receiver.

In testimony whereof we have affixed our signatures.

ELMER A. SPERRY.
ELMER A. SPERRY, Jr.